United States Patent
Inoue et al.

(10) Patent No.: US 6,555,268 B1
(45) Date of Patent: Apr. 29, 2003

(54) NEGATIVE ELECTRODE FOR SECONDARY CELL, NEGATIVE PLATE FOR SECONDARY CELL, AND SECONDARY CELL COMPRISING THE SAME

(75) Inventors: Kaoru Inoue, Osaka (JP); Shusaku Goto, Osaka (JP); Yui Takahashi, Osaka (JP); Toyoji Sugimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,335

(22) PCT Filed: Jun. 8, 1999

(86) PCT No.: PCT/JP99/03065
§ 371 (c)(1),
(2), (4) Date: May 10, 2000

(87) PCT Pub. No.: WO99/65096
PCT Pub. Date: Dec. 16, 1999

(30) Foreign Application Priority Data

Jun. 9, 1998 (JP) .......................... 10-160111

(51) Int. Cl.[7] .............................. H01M 4/62
(52) U.S. Cl. .................. 429/217; 429/212; 429/231.8
(58) Field of Search ................ 429/212, 217, 429/231.8

(56) References Cited

U.S. PATENT DOCUMENTS 5,378,560 A  *  1/1995  Tomiyama .................. 429/217
5,631,100 A  *  5/1997  Yoshino et al. ............. 429/62
6,225,003 B1 *  5/2001  Krawiec et al. ............ 429/217

FOREIGN PATENT DOCUMENTS

| GB | 2 000 518   | * | 1/1979  |
| JP | 53-74242    |   | 7/1978  |
| JP | 53-74247    | * | 7/1978  |
| JP | 4-255670    |   | 9/1992  |
| JP | 4-286875    |   | 10/1992 |
| JP | 4-342966    |   | 11/1992 |
| JP | 6-215761    |   | 8/1994  |
| JP | 8-250123    |   | 9/1996  |
| JP | 8-306391    |   | 11/1996 |
| JP | 10-154513   |   | 6/1998  |

OTHER PUBLICATIONS

Kraton Polymers data document. Kraton D1101 Polymer and Kraton D1116 Polymer. Feb. 2001.*

* cited by examiner

Primary Examiner—Patrick Ryan
Assistant Examiner—Tracy Dove
(74) Attorney, Agent, or Firm—RatnerPrestia

(57) ABSTRACT

A binder made of a mixture of a first binder component including styrene butadiene copolymer containing styrene at between 20% and 70%, and a second binder component selected from at least one of styrene butadiene copolymer containing styrene at between 80% and 100% and polystyrene is used for the negative electrode of rechargeable batteries comprising a carbon material and the binder. The use of the negative electrode comprising the carbon material and binder results in good resistance to peeling of a coated film, and thus ease of handling of a negative electrode sheet. Consequently, rechargeable batteries with good low-temperature discharge characteristics are supplied at good yield.

7 Claims, 1 Drawing Sheet

NEGATIVE ELECTRODE FOR SECONDARY CELL, NEGATIVE PLATE FOR SECONDARY CELL, AND SECONDARY CELL COMPRISING THE SAME

This application a U.S. National Phase Application of PCT International application PCT/JP99/03065.

FIELD OF THE INVENTION

The present invention relates to the field of negative electrodes for rechargeable batteries, and more particularly to binders and the carbon materials contained in the negative electrodes of rechargeable batteries using non-aqueous electrolyte.

BACKGROUND OF THE INVENTION

The high energy density and high power of rechargeable batteries that use non-aqueous electrolytic solutions, particularly rechargeable lithium batteries, have made them a growing focus of research interest.

As for the active material of positive electrodes for rechargeable lithium batteries, lithium containing transition metal oxides such as $LiCoO_2$ and $LiNiO_2$, and chalcogen compounds including $MoS_2$ have been studied. These compounds have a layered crystal structure, into which lithium ions may be reversibly intercalated and deintercalated. As for the active material of the negative electrode, on the other hand, the use of lithium metal has been studied. However, lithium metal results in formation of dendritic lithium on the surface of lithium because of repeated dissolution and deposition of lithium during charge and discharge. The formation of dendritic lithium decreases the charge and discharge efficiency. In addition, dendritic lithium on the negative electrode causes internal shortcircuiting by contacting the positive electrode.

To avoid these disadvantages, the use of lithium alloys, metal powder, graphite and non-crystallized carbon material, metal oxides, and metal sulfides as the negative electrode material has been studied with the aim of identifying a material which would enable the reversible intercalation and deintercalation of lithium ions.

A cylindrical battery using a negative electrode made of lithium alloy processed into a sheet undergoes fragmentation of the sheet alloy, caused by repeated and intensive charging and discharging, thus reducing its collecting capability, and resulting in degradation of its charge and discharge cycle characteristics.

A sheet electrode made of metal powder, carbon material, metal oxide, or metal sulfide requires the addition of a binder because an electrode cannot be formed only of these materials. For example, the Japanese Laid-open Patent No. H4-255670 discloses a method for forming a negative electrode from a carbon material by adding an elastic rubber polymer material as a binder. When using a metal oxide or metal sulfide for the negative electrode, a conductive material is further added in addition to the binder to achieve better charge and discharge characteristics.

In general, when the carbon material is used as the negative electrode, it is first ground into powder and then is formed into an electrode plate using the binder. The conventional method of using a rubber polymer material as a binder, however, causes the binder to coat graphite particles and interfere with the intercalation and deintercalation of lithium, resulting in a significant decrease in the otherwise high efficiency discharge characteristics of the battery, particularly at low temperatures. If graphite which has a high degree of crystallization is used as the carbon material, a battery with higher capacity and voltage is achievable compared to one using the carbon material. However, the graphite materials fragment into flakes when ground. If the negative electrode sheet is made of such ground material, the flat surfaces of graphite flakes not involved in the deintercalation align themselves parallel to the electrode plate face, resulting in a significant decrease in the otherwise high efficiency discharge characteristics of the battery, particularly at low temperatures.

If conventional binders are used, a large quantity of binder needs to be added, regardless of the type of carbon used, because conventional binders have weak adhesion to metal core of the electrode. This causes the binder to cover the surface of the carbon material, degrading the battery's otherwise high efficiency discharge characteristics. On the other hand, a smaller amount of binder has lower adhesion, and increases the defect rate in the manufacturing process of rechargeable batteries, including the peeling of the electrode material from the core material. Accordingly, satisfactory characteristics have not yet been achieved in rechargeable lithium batteries that use carbon material for the negative electrode.

SUMMARY OF THE INVENTION

The present invention relates to the manufacture of the negative electrode for rechargeable batteries using non-aqueous electrolyte containing carbon material which intercalates and deintercalates lithium and binder. A mixture of Binder (A) selected from styrene butadiene copolymer containing styrene at between 20% and 70% and Binder (B) selected from at least one of styrene butadiene copolymer containing styrene at between 80% and 100%, and polystyrene, as a binder for a negative electrode material is used as the binder in the negative electrode material of the present invention.

The rechargeable batteries using non-aqueous electrolyte of the present invention comprises a negative electrode sheet made by applying the negative electrode materials as configured above onto a collector made of a copper foil, a positive electrode plate using lithium containing composite oxide as an active material, and non-aqueous electrolyte. Further, the non-aqueous electrolyte contains ethylene carbonate and alkyl carbonates.

DESCRIPTION OF THE PREFERRED EMBODIMENT

Figure 1:
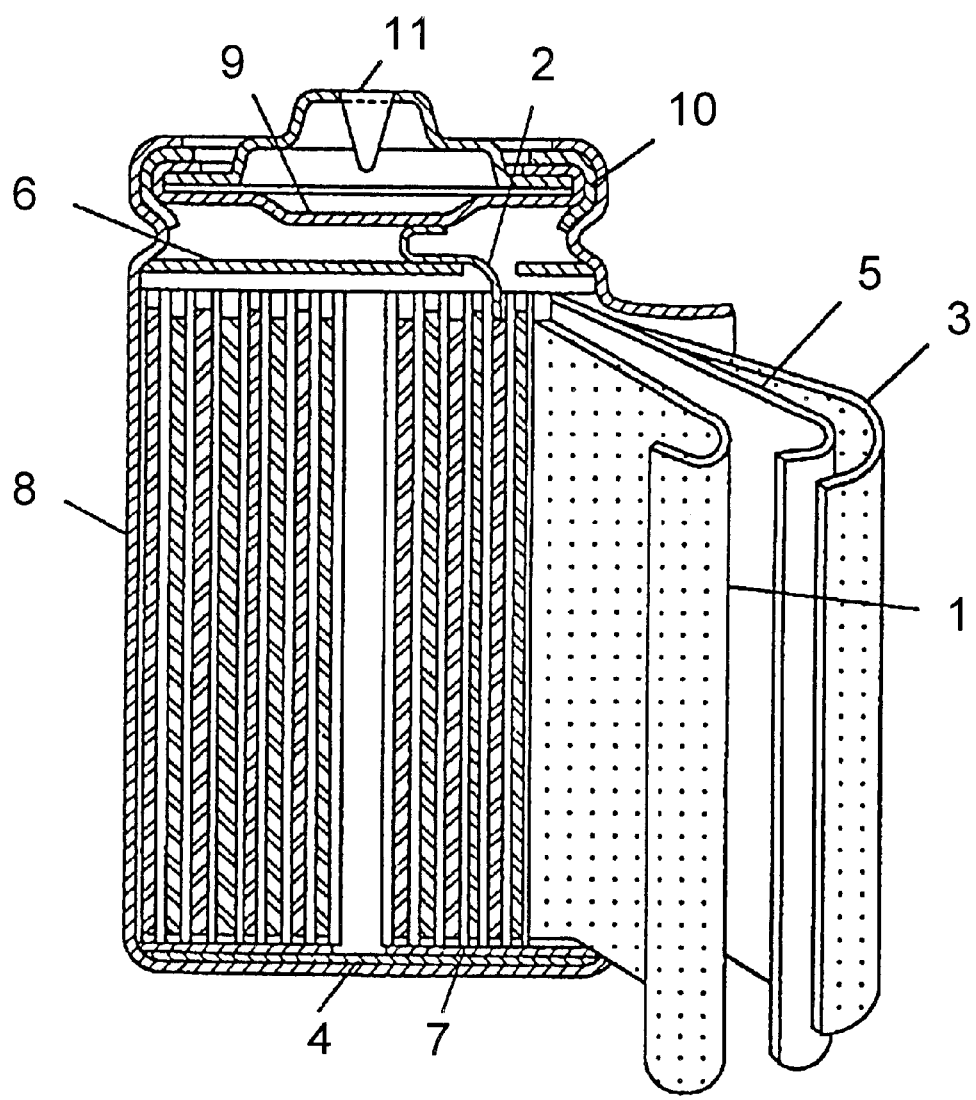
FIG. 1 is a vertical sectional view of a rechargeable battery using non-aqueous electrolyte in an exemplary embodiment of the present invention.

A negative electrode for rechargeable batteries using non-aqueous electrolyte of the present invention is made of a carbon material that intercalates and deintercalates lithium and binder. The binder in the negative electrode of the present invention is made of a mixture of:

Binder (A) selected from styrene butadiene copolymer containing styrene of between 20% and 70%; and Binder (B) selected from at least one of styrene butadiene copolymer containing styrene of between 80% and 100%, and polystyrene.

The carbon material in the negative electrode of the present invention is graphite having a mean particle size between 5 and 30 μm. A proportion of Binder (A) and Binder (B) to the carbon material in the negative electrode is at between 0.3 and 4.

The rechargeable battery using non-aqueous electrolyte of the present invention comprises
  a negative electrode sheet onto which the negative electrode material as described above is applied to a collector made of copper foil;
  a positive electrode plate using Li containing composite oxide as an active material; and
  non-aqueous electrolyte In addition, the non-aqueous electrolyte contains ethylene carbonate and alkyl carbonates.

The above configuration achieves a negative electrode for rechargeable batteries using non-aqueous electrolyte which can be handled easily and has an electrode plate with good strength. Discharge characteristics at low temperatures of the rechargeable battery using non-aqueous are also improved. The above improvement is thought to be attained by the following reasons.

Binder (B) selected from styrene butadiene copolymer containing styrene at between 80% and 100% or polystyrene adheres to carbon particles while scarcely coating them, and Binder (A) selected from styrene butadiene copolymer containing styrene at a proportion of between 20% and 70% binds the carbon particles to each other through Binder (B). Binder (B) only scarcely coats carbon particles because the glass transition temperature of the binder containing a large amount of styrene is high, resulting in reduction of film formation by the binder. Accordingly, the discharge characteristics at low temperatures improve. Binder (A) is added to Binder (B) to increase adhesion because Binder (B) has low elasticity, and is thus brittle, as it contains a small amount of butadiene that has double-bond. Addition of Binder (A) to the negative electrode material secures the adhesion of the negative electrode material to the core material, thus achieving a negative electrode sheet with good resistance to peeling which provides ease of handling.

The ratio of Binder (A) and Binder (B) to the carbon is preferably between 0.3 and 4 for both Binders (A) and (B) when the carbon material is 100. The carbon material includes natural graphite, artificial graphite, carbon made by sintering easily crystallizable carbon obtained from petroleum or coal pitch or coke at between 650 and 1000° C.; non-fusible treated petroleum or coal pitch or coke; and a not easily crystallizable carbon material made by decomposing and sintering resins at between 600 and 1300° C. These materials may be used independently or mixed. In particular, the use of graphite such as natural graphite and artificial graphite are preferable.

With respect to the crystal structure, graphite having a pitch (d(002)) of 3.335 to 3.40 Å for the hexagonal plane and 100 Å or above for the crystal size ($L_c$) in the c axis direction is preferable. Other than carbon atom, other atoms or compounds such as O, B, P, N, S, SiC, and $B_4C$ may be included in the carbon material. The mean particle size of the carbon material used in the present invention is also preferably between 5 and 30 μm. If the mean particle size of the carbon material is too small, irreversibility of the capacity of the carbon material in the negative electrode increases, resulting in significant reduction of the discharge capacity. If the mean particle size is too large, on the other hand, the high efficiency discharge characteristics are reduced.

The materials used in the present invention are detailed next.

The negative electrode used in the present invention is made by applying coating dispersion containing a carbon material which electrochemically intercalates and deintercalates lithium ion and the binders on the surface of a collector.

As for the collector of the negative electrode, any electrical conductor may be used as long as it does not react chemically inside the completed battery. For example, stainless steels, nickel, copper, titanium, carbon, copper, stainless steel coated with carbon, nickel, titanium or silver, or Al—Cd alloy may be used. In particular, copper or copper alloy is preferable as the collector of the negative electrode, with copper being the most preferable in the present invention.

A positive electrode used in the present invention is made by applying coating dispersion containing an active material for the positive electrode which electrochemically intercalates and deintercalates lithium ion, conductive material, and binder on the surface of the collector.

The positive active material of the present invention may be made of transition metal oxides, lithium containing transition metal oxides, transition metal sulfides, lithium containing transition metal sulfides, and organic polymer compounds. In particular, it is preferable to use a lithium containing composite oxide or lithium containing composite sulfide containing at least one transition metal such as Ti, V, Cr, Mn, Fe, Co, Ni, Cu, Mo, and W. In particular, for batteries requiring high voltage and high energy density, $LiCoO_2$, $LiNiO_2$, and $LiMn_2O_4$ are preferable. These positive active materials may be used independently or mixed.

As for the conductive material in a coated film of positive electrode of the present invention, any electron conductive material may be used as long as it does not react chemically inside the completed battery. For example, graphite such as natural graphite (graphite flakes, ground graphite flakes, etc.) and artificial graphite; carbon blacks including acetylene black, highly structured carbon black, channel black, furnace black, lamp black, and thermal black; conductive fibers including carbon fiber and metal fiber; metal powder including copper, nickel, aluminum, and silver; conductive whiskers including zinc oxide and potassium titanate; conductive metal oxides including titanium oxide; or organic conductive materials including polyphenylene derivatives may be used. These materials may be used independently or mixed.

A preferable binder for the positive active material of the present invention may be polymers which have decomposition temperature of 300° C. or above. For example, polyethylene, polypropylene, polytetrafluoroethylene (PTFE), polyvinylidene fluoride (PVDF), tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and fluorovinylidene-perfluoromethylvinylether-tetrafluoroethylene terpolymer. In particular, polyvinylidene fluoride (PVDF) and polytetrafluoroethylene (PTFE) are most preferable.

As for the collector of the positive electrode, any electric conductor may be used as long as it does not react chemically inside the completed battery. For example, stainless steel, aluminum, titanium, carbon, aluminum or stainless steel coated with carbon, titanium, or silver may be used. In particular, aluminum or aluminum alloy is preferable.

As for the coated film of the positive electrode, filler, dispersant, ion conductive material, pressure intensifier, and other additives may be used as well as conductive materials and binders. Any fiber filler which does not chemically react inside the completed battery may be used. In general, olefin polymer such as polypropylene and polyethylene, glass, or fibers such as carbon may be used.

The non-aqueous electrolyte of the present invention comprises a solvent and lithium salts dissolved in the solvent. As for the non-aqueous solvent, for example, cyclic carbonates including ethylene carbonate (EC), propylene carbonate (PC), buthylene carbonate (BC), and vinylene carbonate (VC);

alkyl carbonates including dimethyl carbonate (DMC), diethyl carbonate (DEC), ethylmethyl carbonate (EMC), and dipropyl carbonate (DPC);

aliphatic carboxylic acids including methyl formate, methyl acetate, methyl propionate, and ethyl propionate;

gammma-lactones including gamma-butyl lactone;

alkyl ethers including 1,2-dimethoxy ethane (DME), 1,2-diethoxy ethane (DEE), and ethoxy methoxy ethane (EME);

cyclic ethers including tetrahydrofuran and 2-methyltetrahydrofuran; and aprotic organic solvents including dimethylsulfuoxide, 1,3-dioxolan, formamide, acetoamide, dimethylformamide, dioxolan, acetonitrile, propionitrile, nitromethane, ethyl monoglyme, acetic acid esters, propionic acid esters, phosphoric acid triesters, trimethoxy methane, dioxolan derivatives, sulfolane, methyl sulfolane, 1,3-dimethyl-2-imidazolidinone, 3-methyl-2-oxazolidinone, propylene carbonate derivatives, tetrahydrofuran derivatives, ethylether, 1,3-propanesultone, anisol, dimethylsulfoxide, and N-methylpyrolidone may be used. These non-aqueous solvents are used independently or by mixing two or more of them. In particular, a mixture of cyclic carbonates and alkyl carbonates, or a mixture of cyclic carbonates, alkyl carbonates, and aliphatic carbonates is preferable. The most preferable non-aqueous solvent of the present invention is that containing ethylene carbonate and alkyl carbonates.

The lithium salts dissolved in the above solvents include $LiCoO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, and $LiB_{10}Cl_{10}$, lithium salts of lower aliphatic carboxylic acids, lithium chloroborate, and lithium tetraphenyl borate. These lithium salts may be used independently or by mixing two or more compounds, with those containing $LiPF_6$ being preferable.

The most preferable non-aqueous electrolyte of the present invention is an electrolytis solution containing at least ethylene carbonate and ethylmethyl carbonate, with $LiPF_6$ as the supporting salt. The volume of electrolyte added in the battery is not particularly specified, and may be determined based on the amount of positive active material and negative electrode materials, and the size of the batteries. The concentration of supporting electrolyte dissolved in non-aqueous solvent is not also specified, but between 0.2 and 3 mol/l is preferable. In particular, between 0.5 and 2.0 mol/l is most preferable.

An exemplary embodiment of the present invention is described next with reference to drawings.

FIRST EXEMPLARY EMBODIMENT

FIG. 1 shows a vertical sectional view of a cylindrical battery of the present invention. Using thickener, a paste-like coating dispersion is made by mixing $LiCoO_2$ as an active material, acetylene black as a conductive material, and polytetrafluoroethylene (PTFE) as the binder at a weight ratio of 100:3:7. This paste-like dispersion is applied to both faces of a piece of aluminum foil, dried, rolled, and then cut into predetermined dimensions (37 mm×390 mm) to manufacture a positive electrode 1. An aluminum lead plate 2 is welded onto this positive electrode 1.

Next, as for the carbon material, graphite flakes with a mean particle diameter of 20 μm, styrene butadiene copolymer containing 50% of styrene, and styrene butadiene copolymer containing 85% of styrene are mixed at a weight ratio of 100:2:2 into a paste-like coating dispersion using thickener. This paste-like coating dispersion is applied on both faces of a piece of copper film, which is then dried, rolled, and cut into predetermined dimensions (39 mm×465 mm) to manufacture a negative electrode 3. A nickel lead plate 4 is welded to this negative electrode 3. A separator 5 made of a porous polyethylene film is interposed between the positive electrode 1 and negative electrode 3. The positive electrode 1, separator 5, and negative electrode 3 are wound spirally to form an electrode plate group. On the top and bottom ends of this electrode plate group, polypropylene insulating plates 6 and 7 are respectively disposed, and then the whole assembly is inserted into a case 8 made of iron plated with nickel. The positive electrode lead 2 is welded onto an insulator 10 provided with a safety valve, and the negative electrode lead 4 is welded onto the bottom of the case 8. As for the electrolyte, lithium hexafluorophosphate is dissolved at a concentration of 1.5 mol/l as electrolyte in a mixed solvent of ethylene carbonate and ethyl methyl carbonate at the volume ratio of 1:3. This electrolyte is injected into the case 8, which is finally sealed with a top cap 10 with a gasket 9 in between to complete the battery A. The reference numeral 11 indicates the positive electrode terminal of the battery and the case 8 functions as the negative electrode terminal. As for the dimensions of the battery A, the diameter is 17 mm, and the height is 50 mm.

Comparative Example 1

A battery B is made as a Comparative Example 1 in the same way as the first exemplary embodiment except for mixing the carbon and styrene butadiene copolymer containing 50% of styrene alone as the binder for the negative electrode at the weight ratio of 100:4.

Comparative Example 2

A battery C is made as a Comparative Example 2 in the same way as Comparative Example 1 except for the use of styrene butadiene copolymer containing 85% of styrene alone as the binder.

Batteries A, B, and C with different binder for the negative electrode are compared with regard to discharge characteristics at low temperatures and strength of negative electrode plate. The state of the negative electrode plate after spirally winding the electrode plate group and then unwinding it was observed to confirm the presence of any cracks in the negative electrode plate.

The discharge capacity is measured after charging at 20° C., constant current 630 mA, and constant voltage 4.2 V for 2 hours, and then discharging at current 180 mA until the final discharge voltage reaches 3.0 V. Discharge characteristics at low temperatures are measured after charging at constant current and voltage under the above conditions, and then discharging at a current of 900 mA at −20° C. until the final discharge voltage reaches 3.0 V. The strength of the negative electrode plate is evaluated by measuring the vertical load at the point where peeling of the coated film from the core material starts, in a test involving applying a 4 mm wide stainless steel scratching rod vertically to the electrode plate, and then pulling the rod horizontally against the electrode plate while increasing the vertical load applied to the scratching rod. The peel strength of the coated film is indicated as the electrode plate strength in Table 1. Cracks in the negative electrode plate were also observed in the same test.

Table 1 shows the discharge characteristics at low temperatures, film peeling strength, and cracks in the negative electrode sheet of each battery. A greater film peeling strength signifies greater electrode plate strength.

TABLE 1

| Battery | Amount of Binder A Styrene content 50% | Amount of Binder B Styrene content 85% | −20° C. Discharge capacity/ mAh | Coated film peel strength (vertical load)/g | Crack on coated film Yes: X No: O |
|---|---|---|---|---|---|
| A | 2 | 2 | 320 | 540 | O |
| B | 4 | 0 | 145 | 520 | O |
| C | 0 | 4 | 335 | 480 | X |

It is apparent from Table 1 that Battery C of the comparative example demonstrates the best discharge characteristics at low temperatures, but cracks in the negative electrode sheet were observed. A large amount of styrene content increases the glass transition temperature, degrading film formation and reducing the coating of graphite particles by the binder. At the same time, however, less amount of butadiene having double-bond in the binder reduces the elasticity, causing brittleness due to lower elasticity, and resulting in greater likelihood of cracks being generated in the negative electrode sheet.

Battery A of the present invention demonstrates better discharge characteristics at low temperatures than Battery B of the comparative example. Battery A also has better electrode plate strength, with no cracks observed in the negative electrode sheet. The reason is not known, but it may be that styrene butadiene copolymer containing 85% of styrene does not coat most of the graphite particles but instead attaches to them, and then styrene butadiene copolymer containing 50% of the styrene adheres the graphite particles to each other through styrene butadiene copolymer containing 85% of styrene. The reason that Battery B in the comparative example has lower discharge characteristics at low temperatures is that the glass transition temperature of styrene butadiene copolymer containing 50% of styrene is low at about −30° C., causing a high level of film formation, and the binder coats the graphite particles.

Table 2 shows discharge characteristics at low temperatures, electrode plate strength (peel strength), and cracks on the negative electrode plate for Battery A of the present invention when styrene content in styrene butadiene co-polymer of the binder (A) is 10, 20, 50, 70, or 80%; and styrene content in styrene butadiene co-polymer of the binder (B) is 70, 80, 85, or 95%. A mixing ratio of the binder (A) and binder (B) is 2 parts in proportion to carbon material 100 parts.

TABLE 2

| Battery | Amount of Binder A Styrene content % | Amount of Binder B Styrene content % | −20° C. Discharge capacity/ mAh | Coated film peel strength (vertical load)/g | Crack on coated film Yes: X No: O |
|---|---|---|---|---|---|
| A | 10 | 70 | 170 | 560 | O |
|   |    | 80 | 180 | 560 | O |
|   |    | 85 | 180 | 560 | O |
|   |    | 95 | 190 | 575 | O |
|   |    | 100 | 200 | 570 | O |
|   | 20 | 70 | 230 | 520 | O |
|   |    | 80 | 300 | 530 | O |
|   |    | 85 | 310 | 550 | O |
|   |    | 95 | 310 | 540 | O |
|   |    | 100 | 310 | 545 | O |
|   | 50 | 70 | 240 | 520 | O |
|   |    | 80 | 310 | 550 | O |
|   |    | 85 | 320 | 540 | O |
|   |    | 95 | 325 | 540 | O |
|   |    | 100 | 330 | 550 | O |
|   | 70 | 70 | 250 | 520 | O |
|   |    | 80 | 310 | 500 | O |
|   |    | 85 | 325 | 510 | O |
|   |    | 95 | 335 | 515 | O |
|   |    | 100 | 340 | 510 | O |
|   | 80 | 80 | 320 | 440 | X |
|   |    | 85 | 330 | 430 | X |
|   |    | 95 | 350 | 440 | X |
|   |    | 100 | 355 | 435 | X |

It is apparent from Table 2 that the discharge characteristics at low temperatures significantly drops when styrene content in the binder (A) is 10%. A crack on the electrode sheet is found when styrene content is 80%. As for the binder (B), discharge characteristics at low temperatures significantly drop when the styrene content is 70%. Accordingly, the styrene content in the binder (A) is preferably between 20% and 70%, and the styrene content in the binder (B) is preferably between 80% and 100% or polystyrene.

Table 3 shows the discharge capacity and discharge characteristics at low temperatures when the mean particle size of graphite flakes in Battery A of the exemplary embodiment is changed.

TABLE 3

| Battery | Graphite flake Mean particle size/μm | Discharge capacity/ mAh | −20° C. discharge capacity/mAh |
|---|---|---|---|
| A | 3 | 880 | 340 |
|   | 5 | 905 | 350 |
|   | 20 | 920 | 335 |
|   | 30 | 925 | 315 |
|   | 40 | 930 | 260 |

It is apparent from Table 3 that the discharge capacity significantly drops when the mean particle size of graphite flakes is smaller than 5 μm, due to increased irreversible capacity of the carbon material in the negative electrode. The discharge characteristics at low temperatures drop when the mean particle size exceeds 30 μm. Accordingly, the mean particle size of graphite flake is preferably between 5 and 30 μm.

Table 4 the relation among discharge characteristics at low temperatures, electrode plate strength, and cracks in the negative electrode sheet when amount of binder added is changed in Battery (A) of the exemplary embodiment. Binder (A) containing 50% of styrene in styrene butadiene copolymer and Binder (B) containing 85% of styrene in styrene butadiene copolymer are used. In Table 4, the amount of binder is shown by the mixing ratio of the binder in proportion to carbon material 100.

In the overall evaluation, those having a discharge capacity of 300 mAh or above, coated film peel strength of 500 g or above, and no cracks on the coated film are considered acceptable.

It is apparent from Table 4 that the coated film peel strength drops below 500 g when 0.2% of Binder (A) is added, and discharge capacity at low temperatures drops below 300 mAh when 5% or more of Binder (A) is added. If the amount of Binder (A) is 0.3%, and the amount of Binder (B) is 5%, cracks on the negative electrode sheet are found. This is due to reduced elasticity of the electrode plate when the mixing ratio of Binder (B) is higher than Binder (A).

Accordingly, the ratio of the binders to 100 weight equivalent of the carbon material is preferably between 0.3 and 4 for styrene butadiene copolymer containing 10% to 70% of styrene, and between 0.3 and 4 for styrene butadiene copolymer containing 80% to 100% styrene or polystyrene.

TABLE 4

| Battery | Amount of Binder A | Amount of Binder B | −20° C. discharge capacity/ mAh | Coated film peel strength (Vertical load/g) | Crack on coated film Yes: X No: O | Overall evaluation* |
| --- | --- | --- | --- | --- | --- | --- |
| A | 0.2 | 0.2 | 380 | 440 | O | X |
|   |   | 0.3 | 395 | 470 | O | X |
|   |   | 2.0 | 370 | 485 | O | X |
|   |   | 4.0 | 350 | 490 | O | X |
|   |   | 5.0 | 325 | 500 | X | X |
|   | 0.3 | 0.2 | 370 | 460 | O | X |
|   |   | 0.3 | 380 | 500 | O | O |
|   |   | 2.0 | 355 | 515 | O | O |
|   |   | 4.0 | 345 | 520 | O | O |
|   |   | 5.0 | 320 | 525 | O | X |
|   | 2.0 | 0.2 | 270 | 485 | O | X |
|   |   | 0.3 | 310 | 515 | O |   |
|   |   | 2.0 | 320 | 540 | O |   |
|   |   | 4.0 | 310 | 550 | O |   |
|   |   | 5.0 | 280 | 560 | O | X |
|   | 4.0 | 0.2 | 265 | 490 | O | X |
|   |   | 0.3 | 310 | 520 | O |   |
|   |   | 2.0 | 315 | 540 | O |   |
|   |   | 4.0 | 310 | 555 | O |   |
|   |   | 5.0 | 270 | 570 | O | X |
|   | 5.0 | 0.2 | 225 | 510 | O | X |
|   |   | 0.3 | 280 | 530 | O | X |
|   |   | 2.0 | 270 | 550 | O | X |
|   |   | 4.0 | 250 | 570 | O | X |
|   |   | 5.0 | 200 | 590 | O | X |

The exemplary embodiments of the present invention use graphite flakes as the carbon material for the negative electrode. However, it is apparent that the same effect is achievable without being limited to this particular type and shape of carbon material.

The present invention also uses $LiCoO_2$ as the active material of the positive electrode. The same effect is achievable with other positive active materials such as $LiNiO_2$ and $LiMn_2O_4$.

As described above, the negative electrode material of the present invention has good discharge characteristics at low temperatures, good film peel strength, and ease of handling. In the above description, the negative electrode material of the present invention is the negative electrode material mainly for rechargeable batteries using non-aqueous electrolyte. However, it is apparent from the structure that the negative electrode material of the present invention may also be used as the negative electrode material for rechargeable batteries using aqueous electrolytic solutions.

INDUSTRIAL APPLICABILITY

The negative electrode material for rechargeable batteries of the present invention has good resistance to film peeling, and is easy to handle. Accordingly, the use of the negative electrode material of the present invention for rechargeable batteries enables the improvement of yield in the manufacture of rechargeable batteries using non-aqueous electrolyte. Furthermore, rechargeable batteries using the negative electrode of the present invention have a large capacity and good discharge characteristics at low temperatures, which leads to better products, achieving significant advantages in industrial applications.

What is claimed is:

1. A negative electrode for a rechargeable battery comprising a negative electrode material and a binder, the binder comprising:
    a first binder component including styrene butadiene copolymer containing between 20 weight % and 70 weight % of styrene; and
    a second binder component including styrene butadiene copolymer containing at least 80 weight % but less than 100 weight % of styrene;
    wherein said rechargeable battery uses non-aqueous electrolyte.

2. The negative electrode for a rechargeable battery of claim 1,
    wherein said binder bonds to a carbon material.

3. A negative electrode for a rechargeable battery comprising a negative electrode material and a binder, the binder comprising:
    a first binder component including styrene butadiene copolymer containing between 20 weight % and 70 weight % of styrene; and
    a second binder component including styrene butadiene copolymer containing at least 80 weight % but less than 100 weight % of styrene;
    wherein said binder bonds to a carbon material; and
    wherein said carbon material is a graphite material having a mean particle size between 5 and 30 µm.

4. A negative electrode for a rechargeable battery comprising
    a negative electrode material and a binder, the binder comprising:
    a first binder component including styrene butadiene copolymer containing between 20 weight % and 70 weight % of styrene; and
    a second binder component including styrene butadiene copolymer containing at least 80 weight % but less than 100 weight % of styrene;
    wherein said binder bonds to a carbon material; and
    wherein a ratio of said first binder component to said carbon material is between 0.3 parts and 4 parts to 100 parts carbon material by weight, and a further ratio of said second binder component to said carbon material is between 0.3 parts and 4 parts to 100 parts carbon material in weight.

5. A negative electrode sheet for a rechargeable battery, said negative electrode sheet having a collector coated with a film substantially comprising a carbon material and a binder, said binder comprising:
    a first binder component including styrene butadiene copolymer containing between 20 weight % and 70 weight % of styrene; and a second binder component including styrene butadiene copolymer containing at least 80 weight % but less than 100 weight % of styrene;

wherein said collector is made of a copper foil.

6. A rechargeable battery comprising:

a positive electrode containing a lithium containing transition metal oxide;

a negative electrode whose collector is coated with a film substantially comprising
  a carbon material, and
  a binder, said binder comprising:
    a first binder component including styrene butadiene copolymer containing of between 20 weight % and 70 weight % of styrene; and
    a second binder component including styrene butadiene copolymer containing at least 80 weight % but less than 100 weight % of styrene;

a separator interposed between said positive electrode and said negative electrode; and a non-aqueous electrolyte.

7. The rechargeable battery using non-aqueous electrolyte of claim 6, wherein said non-aqueous electrolyte includes an organic solvent containing ethylene carbonate and alkyl carbonate in which lithium salts are dissolved.

* * * * *

UNITED STATES PATENT AND TRADEMARK OFFICE
CERTIFICATE OF CORRECTION

PATENT NO. : 6,555,268 B1
DATED : April 29, 2003
INVENTOR(S) : Inoue et al.

It is certified that error appears in the above-identified patent and that said Letters Patent is hereby corrected as shown below:

<u>Title page,</u>
Item [57], ABSTRACT,
Line 10, "sheet" should read -- plate --.

<u>Column 10,</u>
Line 57, "by" should read -- in --.

Signed and Sealed this

Eleventh Day of November, 2003

JAMES E. ROGAN
*Director of the United States Patent and Trademark Office*